United States Patent [19]

Fowle et al.

[11] 4,119,274
[45] Oct. 10, 1978

[54] FLOW DIVERTER

[75] Inventors: Norman F. Fowle, North Palm Beach; William M. Madden, Palm Springs; James F. Marshall, Lake Park, all of Fla.

[73] Assignee: United Technologies Corporation, Hartford, Conn.

[21] Appl. No.: 754,772

[22] Filed: Dec. 27, 1976

[51] Int. Cl.² ............................................. B64C 15/06
[52] U.S. Cl. ................................ 239/265.29; 239/591
[58] Field of Search ................... 239/265.29, 265.27, 239/265.37, 265.33, 397.5, 591; 244/110 B; 60/226 A, 229, 230; 115/42, 12 R; 114/48

[56] References Cited

U.S. PATENT DOCUMENTS

| 3,035,411 | 5/1962 | Porowski | 239/265.29 |
|---|---|---|---|
| 3,262,264 | 7/1966 | Gardiner et al. | 239/265.29 X |
| 3,972,475 | 8/1976 | Nelson et al. | 239/397.5 |

Primary Examiner—John J. Love
Assistant Examiner—Michael J. Forman
Attorney, Agent, or Firm—Jack N. McCarthy

[57] ABSTRACT

A flow diverter located in a cylindrical duct has two opposite side sections of the duct formed of semi-circular cross-section movable between an open position for flow through said cylindrical duct and a closed position where the side sections cooperate to block flow through said duct, said side sections have the same width and both have ends of semi-circular shape; said semi-circular shape having a diameter equal to the width of the section. Pivots extend outwardly from each end of each section and are mounted for pivotal movement in a mounting structure fixed externally of said duct. Said opposite side sections have a cooling liner which has an overlapping sealing arrangement.

4 Claims, 5 Drawing Figures

FLOW DIVERTER

BACKGROUND OF THE INVENTION

This invention relates to flow diverting means for fluid flows and more particularly to exhaust ducts of gas turbine engines. Other flow diverters are shown in the following U.S. Patents: U.S. Pat. No. 2,780,058; U.S. Pat. No. 2,849,861; U.S. Pat. Re. No. 24,703; and U.S. Pat. No. 3,024,605.

SUMMARY OF THE INVENTION

A primary object of the present invention is to provide a flow diverter which will permit flow to pass axially through a cylindrical duct in one position and providing blockage of the duct in another position while providing a large diverter opening for a diverted exhaust stream.

Another object of the invention is to provide a flow diverter which will provide a shorter duct length and reduce the number of elements necessary for the diverting of flow so that the weight of the device may be kept at a minimum.

Another object of the invention is to provide a flow diverter wherein the valve members are portions of the cylindrical flow wall and provide at their blocking position for a 90° turn.

Another object of the invention is to provide a flow diverter which has cylindrical sections on each end of the valve members so that the portions of the flow wall can be pivoted, said sections serving to block flow when the valve members are closed.

Another object of the invention is to provide a flow diverter wherein a sealed liner can be used in the event an outer coolant passage is necessary.

DESCRIPTION OF THE PREFERRED EMBODIMENT

Figure 1:
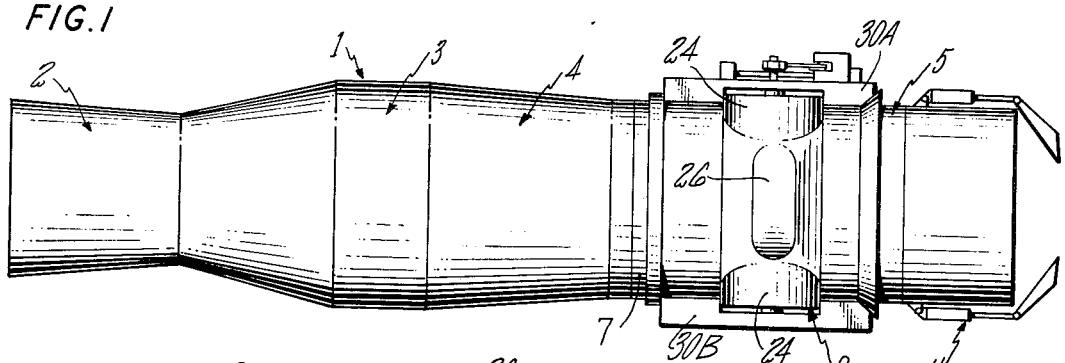
FIG. 1 is a side view of a jet engine having a flow diverter located in the exhaust duct.

Referring to FIG. 1, a conventional gas turbine engine 1 is shown having a compressor section 2, burner section 3, turbine section 4, and an exhaust section 5. The exhaust section 5 includes an exhaust duct 7, diverter valve 9 and an exhaust nozzle 11. The flow diverter valve 9 provides means for permitting the flow from the turbine to be directed to the nozzle 11 or be diverted through the sides of the exhaust duct 7 to be used for thrust reversal or use in V/STOL constructions. Struts 19, extending from the duct downstream of turbine section 4, provide support for a center-body which may be used to support A/B flameholders (not shown).

Figure 2:
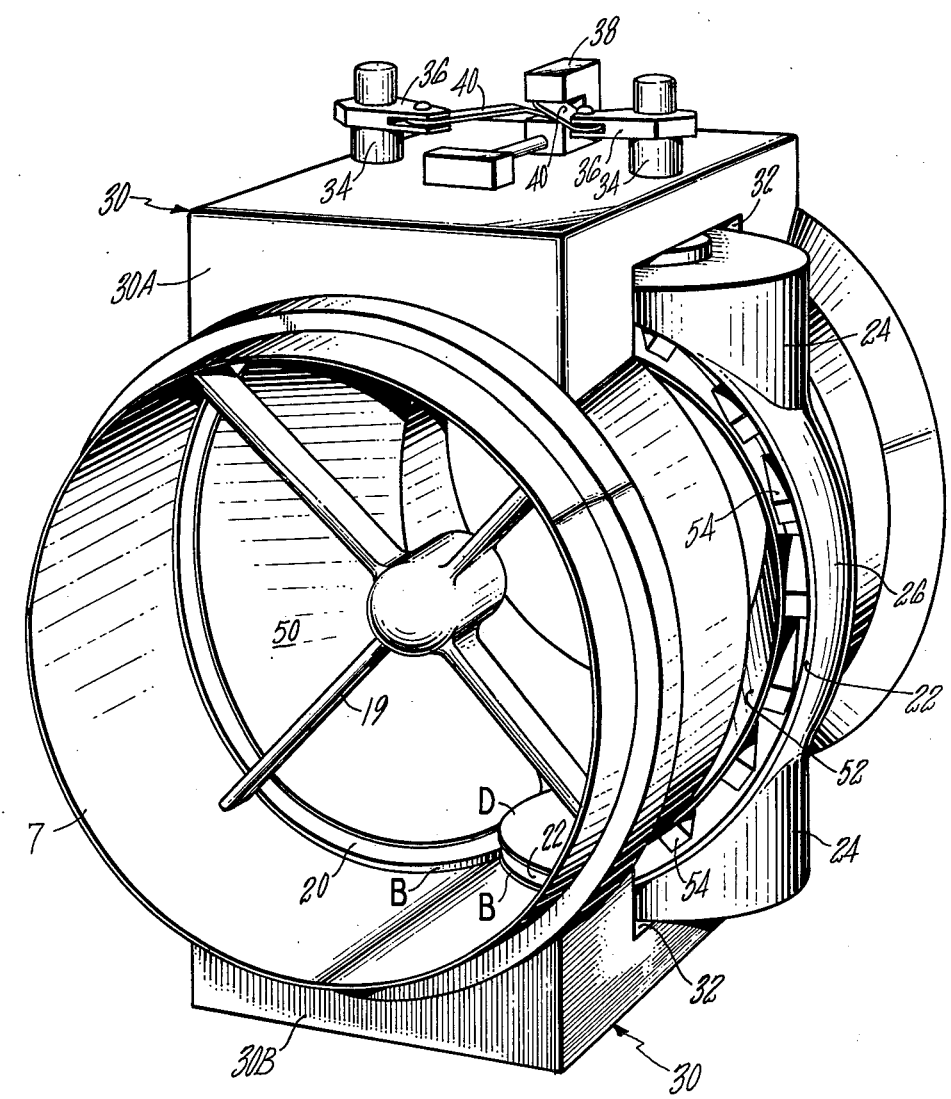
FIG. 2 is a perspective view of a section of the exhaust duct with the flow diverter in a position as it is starting to move to its closed or diverting position.
Figure 3:
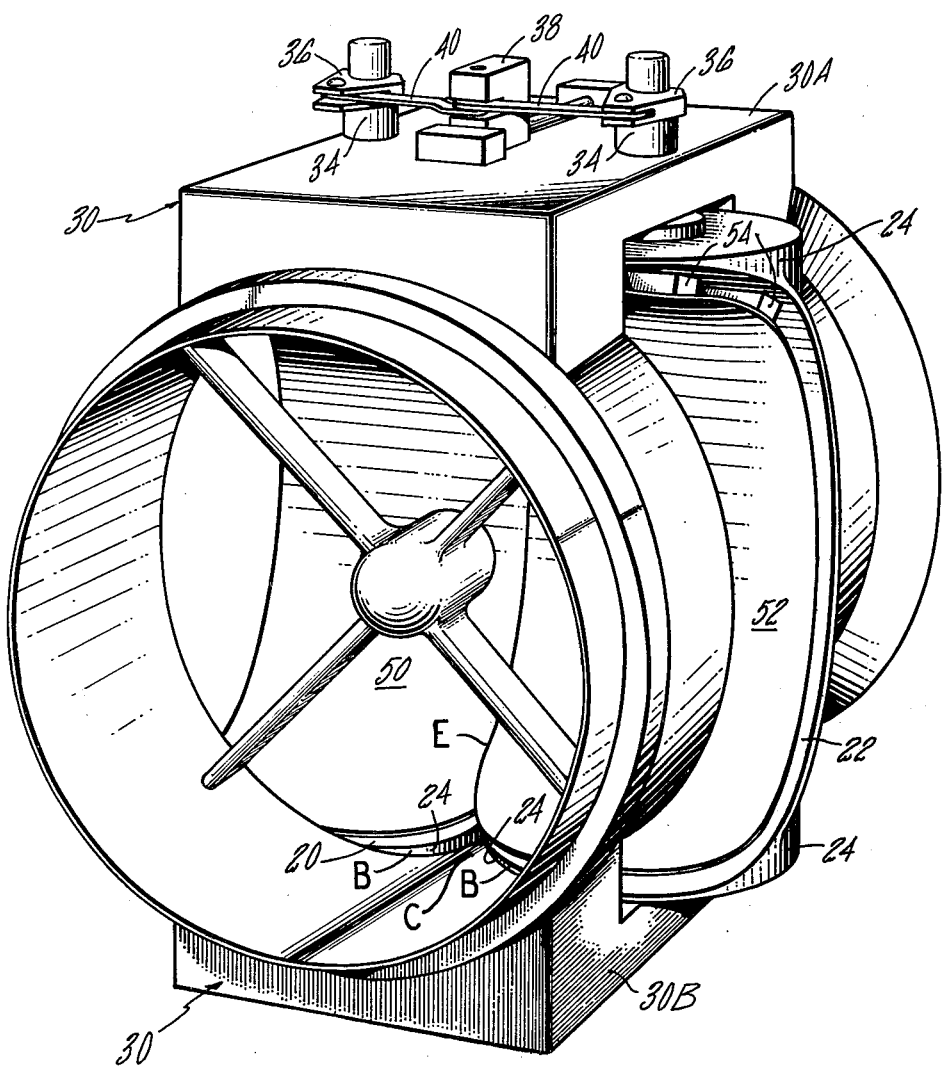
FIG. 3 is a perspective view of a section of the exhaust duct with the flow diverter in its closed or diverting position.

The exhaust duct 7 has two opposite side sections 20 and 22 of semicircular cross-section which will move between an open position (see FIG. 4 and FIG. 2) where they form a portion of the sides of said cylindrical duct to permit flow to pass to the exhaust nozzle 11, and a closed or diverting position (see FIG. 5 and FIG. 3) where they cooperate to form a block to the flow through said exhaust duct 7 and divert it out of both sides 90° to the axis of the engine 1 for any purpose desired.

Figure 4:
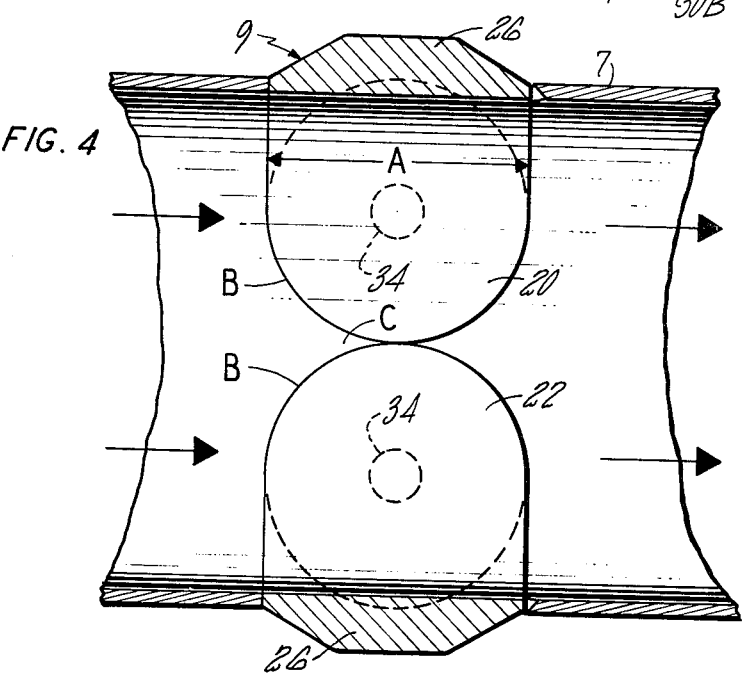
FIG. 4 is a schematic view showing a section of the exhaust duct with the flow diverter in its open position.
Figure 5:
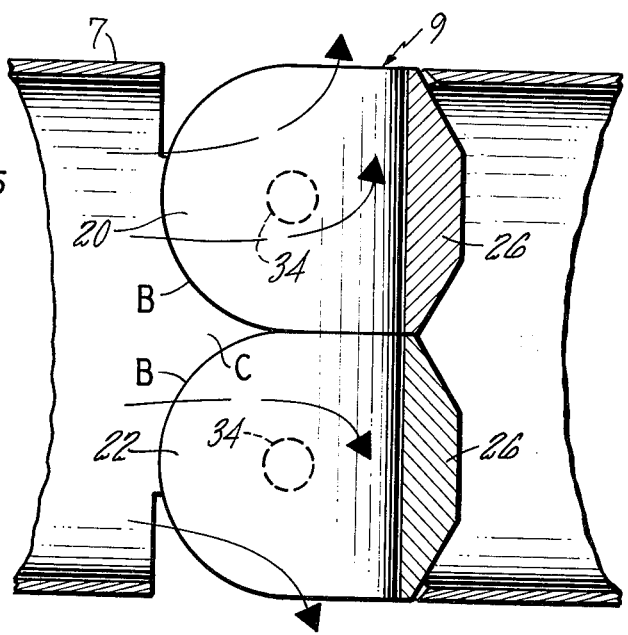
FIG. 5 is a schematic view showing a section of the exhaust duct with the flow diverter in its closed or diverting position.

The side sections 20 and 22 are each formed having the same width A with the ends being of semi-circular shape as at B, the semi-circular shape having a diameter equal to the width A of the section. Cooperating ends of the sections are located adjacent each other and are positioned to move between their open and diverting positions as shown in FIGS. 4 and 5 substantially maintaining line contact. The ends of the side sections each have a cylindrical section 24 extending outwardly from the exterior of exhaust duct 7 of the same diameter A as the diameter of the end of the side sections. The cylindrical sections 24 on the ends of each side section 20 and 22, are aligned on the same axis to permit the side sections to rotate. The sections are built up at 26 to provide stiffening support for the sections as they rotate to perform their functions.

Mounting means 30, comprising top and bottom mounting structure 30A and 30B, respectively, is fixed to the exhaust duct 7 to provide for mounting the side sections 20 and 22 for pivotal movement. Openings 32 are provided on each side of mounting structure 30A and 30B to receive the free ends of the cylindrical sections 24. Pivot pins 34 extend through the mounting structure 30A and 30B, permitting rotation about an axis. The pivot pins 34, extending through the top of the mounting structure 30A, have lever arms 36 connected thereto which in turn have their free ends connected to a slidable actuator 38 by links 40. It can be seen that as slidable actuator 38 is moved between its position in FIG. 2 to its position in FIG. 3, the sections 20 and 22 will be rotated. While the slidable actuator 38 is shown as a block slidably mounted on a rod, it is noted that other types of actuating devices can be used. Further, while no power device is shown, it is recognized that a hydraulic cylinder and piston unit can be used to move this device.

The adjacent ends of openings 32, in top mounting structure 30A and bottom mounting structure 30B, are of semi-circular shape to receive the ends of the cylindrical sections 24 as they are placed in the openings 32. When the sections are in the position shown in FIG. 3, the adjacent cylindrical sections 24 serve to block the area between the side sections 20 and 22 and the duct 7 extended at C to prevent flow therethrough to the exhaust nozzle 11.

In a model built, the width A of the sections 20 and 22 was made one-half of the diameter of the exhaust duct 7, and the centers of the cylindrical section 24, and aligned pivot pins 34, were spaced apart the same distance A.

A liner 50 is spaced inwardly from the side section 20 by a plurality of standoff sections, not shown, and a liner 52 is spaced inwardly from the side section 22 by a plurality of standoff sections 54. These standoff sections can be made of a narrow width if a greater area is desired. When the side sections 20 and 22 are in their open position, cooling fluid can pass between the liners 50 and 52 and their respective side sections 20 and 22 to provide cooling when desired; when this is done, the downstream portion of the exhaust duct 7 can be formed with a continuing liner and coolant space as can the forward part of the exhaust duct 7. The liner sections are formed similar to the side sections with the exception being that the liner 52 is formed of a greater width and length so that it extends over the adjacent liner at its ends at D (see FIG. 2) when the side sections are in their open positions and when the side sections 20 and 22 move to their closed or diverting position (see FIG. 3), the inner edge of the liner 52 will be overlapping liner 50 at E.

We claim:

1. In combination, a cylindrical duct (7) for flow therethrough, said duct having two directly opposite side sections (20, 22) of semi-circular length movable between an open position where they form a portion of the sides of said cylindrical duct when flow passes through said duct and a closed position where they cooperate to form a block to the flow through said duct and divert it out of both sides, each side section is formed having the same width (A) along its semi-circular length with the ends being of semi-circular shape (B), said semi-circular shape of each end of each section having a diameter equal to the width (A) of the section, cooperating ends of semi-circular shape (B) are located adjacent each other, pivot means (34) extend outwardly from each end of each section at the center of said semi-circular shape, mounting means (30) fixedly positioned externally of said duct, said pivot means being pivotally mounted in said mounting means, means (36, 38, 40) for moving said two side sections between their open and closed positions.

2. A combination as set forth in claim 1 wherein said pivot means includes a short cylindrical section (24) fixed to and extending away from each end of each side section, each cylindrical section being mounted in said mounting means, each cylindrical section having a rotational axis, a first pin (34) extending from the end of each cylindrical section on said axis, each pivot pin being pivotally mounted in said mounting means, said cylindrical sections of each side section being axially aligned with each other and each having an external diameter which extends from the ends of semi-circular shape (B), said cylindrical sections (24) blocking flow between the ends of the side sections (20, 22) and duct (7) when the side sections are in their closed position.

3. A combination as set forth in claim 2 wherein said mounting means (30) comprises a mounting structure fixed with relation to said cylindrical duct at diametrically opposed sides thereof to receive the pivot pins (34), said mounting structure also having openings (32) shaped to receive the ends of the cylindrical sections (24).

4. A combination as set forth in claim 1 wherein said side sections have liners (50, 52) to provide for a cooling passage around said duct, said liner of one side section overlapping the liner of the other side section in their closed position (at E) to provide a sealing action therebetween.

* * * * *